3,404,164
NOVEL SULPHO-SUCCINATE DERIVATIVES OF ETHOXY-STEROLS AND OF ETHOXY-STEROL ESTERS, THEIR PREPARATION AND EMPLOYMENT AS EMOLLIENTS

Kenneth Richard Dutton, New Malden, and Wolfgang Benjamin Reinisch, Kingston-on-Thames, England, assignors to Dutton and Reinisch Limited, London, England
No Drawing. Filed Sept. 8, 1964, Ser. No. 398,469
Claims priority, application Great Britain, Sept. 6, 1963, 35,241/63
(Filed under Rule 47(a) and 35 U.S.C. 116)
9 Claims. (Cl. 260—397.2)

This invention relates to novel sulpho-succinate derivatives of ethoxy-sterols and of ethoxy-sterol esters, their preparation and employment as emollients.

The presence of an emollient often is considered a useful or desirable ingredient of those preparations likely to come into contact with the human skin, hereinafter generally designated "topical preparations," and for example cosmetic preparations. Various emollients such as oils, fats, fatty alcohols and esters of fatty acids have been proposed but one of the most popular agents has been, and still is lanolin which is a mixture of esters of cholesterol and of other sterols. The use of lanolin does have its disadvantages however and one of these is because lanolin is water-insoluble and water-dispersible only with difficulty. Accordingly lanolin can only be formulated with difficulty and in restricted amounts in clear liquid preparations. Moreover, lanolin is a rather sticky material and this is disadvantageous for certain applications.

We have now discovered a novel class of compounds of emollients which are chemically related to lanolin and which are either water-soluble or easily water-dispersible. Further the use of these compounds at conventional emollient concentration level in topical preparations produces a less sticky result than lanolin itself. This property is valuable in that an increased proportion of emollient may now be employed before reaching the tolerated stickiness of a topical composition.

Accordingly, this invention provides in one aspect, as compounds of emollient effect, the sulpho-succinates of ethoxy-cholesterol of ethoxy-wool wax alcohols and of ethoxylated lanolin.

The sulpho-succinates of this invention are prepared by a process in which an appropriate ethoxy-sterol or ethoxy-sterol ester is reacted with maleic anhydride to produce a half-ester of maleic acid, which is reacted with a water-soluble sulphite or bisulphite to produce a sulpho-succinate derivative and the product neutralised to remove any residual acidity, if a neutral product is desired.

The ethoxy-sterol or ethoxy-sterol ester starting material may be commercially available. This material is prepared by the reaction of ethylene oxide and appropriate sterol or sterol ester in a mutual molecular ratio of 1–50:1, above all in a ratio of 1–30:1. The wool wax alcohols referred to herein are commercially available products, prepared from lanolin by hydrolysis and the subsequent removal of the fatty acid fraction. In the case of lanolin itself the commercially available ethoxylated lanolin will be suitable.

The reaction of the half-ester of maleic acid with a water-soluble compound selected from the class of sulphites and bisulphites is carried out to effect addition at the double bond to produce a sulpho-succinate. Generally the sulphite and bisulphite are alkali metal derivatives, preferably those of sodium. The reaction is usually effected in an aqueous solution.

If a bisulphite is used at this stage, the resulting product will be acid, and neutralization, by the use of a basic material, will usually be effected. Where, on the other hand, a sulphite is used, some acidity may remain due to an excess of maleic anhydride having been intentionally employed or due to the reaction being incomplete. The neutralisation is best effected using an alkali metal hydroxide say sodium hydroxide or an alkylolamine.

Some isomers and/or side-products may be present in the final product dependant on the reactants and the reaction conditions but those skilled in the art will realise that, unless these exert an irritant, toxic or otherwise harmful effect, removal thereof is not necessary. Of course, these products could be removed, and the sulpho-succinate of an ethoxy-sterol or ethoxy-sterol ester proper isolated for subsequent use in topical applications but generally speaking, such procedure is not required and to be avoided for economic reasons.

This invention extends to the products of the process just described, including the isolated sulphosuccinates of ethoxy sterols and ethoxy-sterol esters.

The compounds of this invention, are characterised by their compatability to water. Naturally however, the activity of any particular derivative will vary from that of another in this and other respects, dependant inter alia on the number of constituent molecules of ethylene oxide. This fact may be employed in preparing a derivative having a specifically desired effect i.e. a "custom-built" product. Special effects can be achieved by combining derivatives of this invention with each other or with other emollients.

The sulpho-succinates of this invention can be and indeed will be used in a wide variety of topical applications, either in addition to or in complete substitution for, the standard emollients. For guidance we list typical examples of topical applications below.

The cosmetic compositions may be aqueous or non-aqueous based. In cosmetic creams comprising emulsions having water as one of the phases, they may act as the main or as a subsidiary emulsifier. In non-aqueous cosmetic compositions, for example, brilliantines or lipsticks, the compounds of this invention may prove difficult to incorporate but their use, if necessary after drying or together with coupling agents, is nonetheless recommended.

The shampoos, liquid detergents, soaps and other cleansing agents, pharmaceutical compositions will be of the usual types. Additionally, these and the foregoing compositions may contain further ingredients such as, colourants, perfumes, germicides (for example hexachlorphene, or dichlormetaxylenol); sun screens (for example methyl salicylate); insect repellants (for example dimethyl phthalate); deodorants; soluble phosphates sequestrants (for example sodium hexametaphosphate or salts of ethylene diamine tetra-acetic acid); and propellants (for example, that available under the trade name Arcton), where aerosol packaging is envisaged.

Indeed the sulpho-succinates of ethoxy-sterols and ethoxy-sterol esters of this invention may act as emollients in any composition, preparation or the like, adapted to or even likely to, come into contact with the human skin. They may be formulated easily into such compositions because of their water-solubility or water-dispersibility and when so acting, they will be effective and exhibit less stickness than standard agents.

This invention extends to topical applications which contain one or more of the emollients of this invention, either alone or in combination with other emollients.

In order that this invention may be well understood, it will be illustrated with reference to the following examples which are non-limitative and show both preparative methods and formulation techniques. All parts given are parts by weight.

Example I.—Preparation of the sulpho-succinate of ethoxy-lanolin

The starting material used in this example was a commercially available ethoxy-lanolin, prepared by the reaction of about 30 molecules of ethylene oxide with about 1 molecule of lanolin. However, no accurate details of the preparation of the starting material, or its molecular weight were known and so a preliminary determination of the amount of maleic anhydride needed, was made.

100 parts of starting material were reacted with 100 parts of maleic anhydride (a large relative excess) in a closed vessel at 80° C. for 45 minutes. 1 gram of the product was dissolved in a mixture of 50 ml. pure benzene and 50 ml. distilled water. The whole was shaken to form a loose emulsion and titrated against standard sodium hydroxide solution, using phenalphthalein as indicator.

The mixture was shaken after each addition of soda and the end point was taken when the red colour persisted for at least a minute. It was assumed that unreacted maleic anhydride titrated under these conditions to yield disodium maleate whereas the product after reaction with the lanolin ethoxylate then contained only 1 reactive carboxylic groupling which could titrate. On this basis from the sodium hydroxide figure obtained the amount of maleic anhydride which had reacted with the lanoline ethoxylate was calculated by straight-forward mathematics. Using the figures obtained in the manner just described for the particular sample of lanoline ethoxylate, 180 parts of the latter material were reacted with 19.2 parts of maleic anhydride at 80° C. for 45 minutes. The resulting reaction product was immediately run into a solution of sodium sulphite containing 52.5 parts of sodium sulphite crystals (approximately 48 percent sodium sulphite content by weight), dissolved in 875 parts water. The temperature of the solution was brought up to 85° C. and kept there for 10 minutes with stirring, and then the whole was cooled to about 30° C. 50 percent (by weight) caustic soda solution was added to bring the product obtained to neutrality.

The final overall product was a clear liquid having some foaming characteristics and capable of blending with aqueous solutions and dispersions.

10 parts of the final product of the foregoing Example I were added to 100 parts of shampoo of 15 parts commercial monoethanolamine lauryl sulphate, 5 parts lauric acid diethanolamide (formed by reaction 1 mol of lauric acid and 2 mols diethanolamine), rest water.

The emollient ingredient blended well with the other materials to yield a mild shampoo.

Example II

The starting material used was commercially available and understood to be the reaction product of wool wax alcohols with ethylene oxide in a molecular ratio of 5:1. Wool wax alcohols, is understood to be a mixture of cholesterol and other materials obtained by the total saponification of wool fat (that is, lanoline) followed by the extraction and purification of the fraction other than the fatty acids present in the original wool fat.

59.7 parts of the ethylene oxide condensate were mixed with 10.0 parts of maleic anhydride at 90° C. This means that the materials were reacted in the proportion of 1 molecule of the ethylene oxide condensate (assuming a molecular weight of 597 this being calculated taking the average molecular weight of the initial wool wax alcohols as being 377 and ethylene oxide as having a molecular weight of 44) to 1 molecule of maleic anhydride plus an excess of approximately 2 percent.

The materials melted together to a clear liquid at the temperature of 90° C. and they were kept at this temperature in a closed vessel for 45 minutes. The whole was then poured with stirring into a solution of sodium sulphite (comprising 26.6 parts of sodium sulphite crystals (approximately 48 percent sodium sulphite content by weight) dissolved in 177.4 parts of water), the temperature of this solution initially being 60° C. The temperature was then brought to 85° C. to 90° C. and kept there for about 10 minutes after which time the mix was allowed to cool to 50° C.

When the tempearture of the mix had reached 50° C. 100 volume hydrogen peroxide was added in amount just enough to destroy the small amount of sulphur dioxide in the liquid. Thereafter, the liquid was brought to neutrality by the addition with good stirring of 50 percent by weight caustic soda solution. The resulting product, which to the inventor's knowledge has never previously been described was a yellow slurry having a smell suggestive of lanoline.

When 1 part of the slurry was diluted with 5 parts of water an opalescent solution was obtained. When further diluted with water, a more nearly clear solution resulted. The slurry produced could be added as an emollient to shampoos or detergent preparations. It was obviously more suitable for cream or paste preparations or other preparations not intended to be crystal clear, on account of its giving an opalescent solution, but employing the amounts normally used, especially in the presence of detergents, liquid preparations could often be clear enough for practical purposes. The material could also be used as such in the formulation of cosmetic creams or pharmaceutical preparations where the presence of water was not objectionable. If necessary of course, the material could be dried.

Example III

The starting material used was a commercially available product, understood to be the reaction product of wool wax alcohols and ethylene oxide in a molecular ratio of 1:15. 51.8 parts of this material were mixed with 5.0 parts of maleic anhydride at 90° C. This means that the materials were reacted in the proportion of 1 molecule of ethylene oxide condensate (a molecular weight of 1037 acting on the aforesaid assumptions) to 1 molecule of maleic anhydride plus an excess of approximately 2 percent.

The materials melted together to a clear liquid at a temperature of 90° C. and were kept at this temperature in a closed vessel for 45 minutes. Then, the whole was poured with stirring into a solution of sodium sulphite (comprising 13.3 parts of sodium sulphite crystals (approximately 48 percent sodium sulphite content by weight) dissolved in 140 parts of water), the temperature of this solution initially being 60° C. The temperature was then brought up to 85° C. to 90° C. and kept there for about 10 minutes, after which time the mix was allowed to cool to 50° C.

After the temperature of the mix had dropped to 50° C., sufficient 100 volume hydrogen peroxide was added as in Example 2, to just destroy the small amount of sulphur dioxide in the liquid. Thereafter, the liquid was brought to neutrality by the addition with good stirring of 50 percent by weight of caustic soda solution.

The resulting product was when made and cooled to room temperature, a clear liquid which gave a clear solution in water at any dilution. The material could be added to shampoos or other detergent preparations as an emollient. Being clearly soluble it was of course, eminently suitable for use in products intended to remain clear liquids. The material however, could, of course, also be used in cream shampoos or paste detergents and in cosmetic or pharmaceutical creams.

We claim:

1. The sulpho-succinates of compounds selected from the group consisting of ethoxy-cholesterol, of ethoxy-wool wax alcohols and of ethoxylated lanolin.

2. The process of preparing a sulpho-succinate of a compound selected from the group consisting of ethoxy-cholesterol, ethoxy-wool wax alcohols and ethoxylated lanolin, which comprises reacting a compound selected from the group consisting of ethoxy-cholesterol, ethoxywood wax alcohols and ethoxylated lanolin, with maleic anhydride in order to produce a half-ester of maleic acid; reacting said half-ester with a solution in water of a compound selected from the group consisting of water-soluble sulphites and bisulphites, to produce a sulpho-succinate and adding to the product an alkaline material in order to neutralize residual acidity.

3. The process of preparing a sulpho-succinate of ethoxy-wool wax alcohols, which method comprises reacting ethoxy-wool wax alcohols with maleic anhydride to produce a half-ester of maleic acid, reacting this with a water-soluble compound selected from the class of sulphites and bisulphites to produce a sulpho-succinate and neutralising the product to remove any residual acidity by the use of a neutralizing agent selected from the class of alkali metal hydroxides and alkylolamines.

4. The process of preparing a sulpho-succinate of ethoxy-lanolin, which method comprises reacting ethoxylated lanolin with maleic anhydride to produce a half-ester of maleic acid, reacting this with a water-soluble compound selected from the class of sulphites and bisulphites to produce a sulpho-succinate and neutralising the product to remove any residal acidity by the use of a neutralising agent selected from the class of alkali metal hydroxides and alkylolamines.

5. The process of preparing a sulpho-succinate of ethoxy-cholesterol, which process comprises reacting ethylene oxide with cholesterol in molecular ratio of 1–50:1 to produce ethoxy-cholesterol, reacting this maleic anhydride to produce a half-ester of maleic acid, reacting this with a water-soluble compound selected from the class of sulphites and bisulphites to produce a sulpho-succinate and neutralising the product to remove any residual acidity by the use of a neutralising agent selected from the class of alkali metal hydroxides and alkylolamines.

6. The process of preparing a sulpho-succinate of ethoxy-wool wax alcohols, which process comprises reacting ethylene oxide with wool wax alcohol in molecular ratio of 1–50:1 to produce ethoxy-wool wax alcohols, reacting this with maleic anhydride to produce a half-ester of maleic acid, reacting this with a water-soluble compound selected from the class of sulphites and bisulphites to produce a sulpho-succinate and neutralising the product to remove any residual acidity by the use of a neutralising agent selected from the class of alkali metal hydroxides and alkylolamines.

7. The process for preparing a sulpho-succinate of a compound selected from the group consisting of ethoxy-cholesterol, ethoxy-wool wax alcohols and ethoxylated lanolin, which comprises reacting ethylene oxide with a compound selected from the group consisting of cholesterol, wool wax alcohols and lanolin in molecular ratio of 1–50:1 to produce the corresponding ethoxy derivative, reacting this with maleic anhydride to produce a half-ester of maleic acid, reacting this with a water-soluble compound selected from the group of sulphite and bisulphite salts to produce the sulpho-succinate and adding an alkaline material to neutralize residual acidity.

8. The process of claim 7, wherein in the reaction of forming the ethoxy-derivative, a molecular ratio of 1–30:1 is used.

9. The process for preparing a sulpho-succinate of ethoxy-cholesterol, which comprises reacting ethoxy-cholesterol with about an equimolecular amount of maleic anhydride to produce a half-ester of maleic acid, reacting this with a compound selected from the group consisting of water-soluble sulphites and bisulphites to produce a sulpho-succinate and neutralizing the product to remove residual acidity by the use of a neutralizing agent selected from the group consisting of alkali metal hydroxides and alkylolamines.

References Cited
UNITED STATES PATENTS
3,301,830   1/1967   Nelson et al. _____ 260—78.5

ELBERT L. ROBERTS, *Primary Examiner.*